(12) United States Patent
Chen et al.

(10) Patent No.: US 10,180,611 B2
(45) Date of Patent: Jan. 15, 2019

(54) DISPLAY PANEL AND THIN FILM TRANSISTOR ARRAY SUBSTRATE

(71) Applicant: WUHAN CHINA STAR OPTOELECTRONICS TECHNOLOGY CO., LTD., Wuhan (CN)

(72) Inventors: Gui Chen, Wuhan (CN); Jingfeng Xue, Wuhan (CN)

(73) Assignee: WUHAN CHINA STAR OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/780,332

(22) PCT Filed: Aug. 13, 2015

(86) PCT No.: PCT/CN2015/086814
§ 371 (c)(1),
(2) Date: Sep. 25, 2015

(87) PCT Pub. No.: WO2017/015992
PCT Pub. Date: Feb. 2, 2017

(65) Prior Publication Data
US 2018/0173066 A1 Jun. 21, 2018

(30) Foreign Application Priority Data
Jul. 29, 2015 (CN) .......................... 2015 1 0458323

(51) Int. Cl.
*G09G 3/36* (2006.01)
*G06F 3/041* (2006.01)
(Continued)

(52) U.S. Cl.
CPC ...... *G02F 1/136286* (2013.01); *G02F 1/1345* (2013.01); *G02F 1/1368* (2013.01);
(Continued)

(58) Field of Classification Search
CPC ......... G02F 1/136286; G02F 1/133345; G02F 1/133514
See application file for complete search history.

(56) References Cited

U.S. PATENT DOCUMENTS

2007/0194211 A1    8/2007   Nagasawa
2014/0104506 A1    4/2014   Okamoto et al.
2016/0343747 A1*   11/2016  Du ........................ G02F 1/1362

FOREIGN PATENT DOCUMENTS

CN    101025533 A    8/2007
CN    104460093 A    3/2015
(Continued)

*Primary Examiner* — Lucy P Chien
(74) *Attorney, Agent, or Firm* — Emerson, Thomson & Bennett, LLC; Roger D. Emerson

(57) ABSTRACT

A liquid crystal display panel and a thin film transistor array substrate are provided. The thin film transistor array substrate includes a pixel area and a fan-out area. The fan-out area has a groove. The thin film transistor array substrate has a substrate, a light shielding layer, a buffer layer, a polysilicon layer, a first insulating layer, a scan line layer, a second insulating layer, a data line layer, a third insulating layer, a common line layer, a touch-sensing line layer, a fourth insulating layer, and a pixel electrode layer. The present invention can prevent wire shorts.

16 Claims, 5 Drawing Sheets

(51) Int. Cl.
    *G02F 1/1333* (2006.01)
    *G02F 1/1335* (2006.01)
    *G02F 1/1343* (2006.01)
    *G02F 1/1345* (2006.01)
    *G02F 1/1362* (2006.01)
    *G02F 1/1368* (2006.01)

(52) U.S. Cl.
    CPC .. *G02F 1/133345* (2013.01); *G02F 1/133514* (2013.01); *G06F 3/0412* (2013.01); *G09G 3/36* (2013.01); *G02F 1/13338* (2013.01); *G02F 2001/134372* (2013.01); *G02F 2201/123* (2013.01); *G02F 2202/104* (2013.01); *G06F 2203/04103* (2013.01)

(56) References Cited

FOREIGN PATENT DOCUMENTS

| CN | 104777654 A | 7/2015 |
|---|---|---|
| CN | 104793420 A | 7/2015 |

\* cited by examiner

DISPLAY PANEL AND THIN FILM TRANSISTOR ARRAY SUBSTRATE

FIELD OF THE INVENTION

The present invention relates to a technical field of displays, and in particular to a liquid crystal display panel and a thin film transistor array substrate.

BACKGROUND OF THE INVENTION

The traditional display panel, such as a low temperature poly-silicon liquid crystal display (LTPS-LCD), fan-out wires are disposed by using the touch-sensing line layer (M3). In a manufacturing process of the display panel, the planarization layer is thicker, and the photoresist easily remains in the trench region of the planarization layer after exposure. Refer to FIGS. 1 and 2, some residual metal is left in the touch-sensing line layer, so that the fan-out wires will have a short-circuit problem, and the touch control of the display panel will be affected.

Therefore, a liquid crystal display panel and a thin film transistor array substrate needs to be developed which can solve the problems existing in the conventional art described above.

SUMMARY OF THE INVENTION

An object of the present invention is to provide a display panel and driving method thereof, which avoids metal remaining in the trench region, and prevents the wires from the short-circuit problem.

To achieve the above object, the present invention provides a display panel which comprises a color filter substrate, a liquid crystal layer, and a thin film transistor array substrate. The thin film transistor array substrate includes a substrate, a light shielding layer disposed on the substrate, a buffer layer disposed on the substrate and the light shielding layer, a poly-silicon layer disposed on the buffer layer, a first insulating layer disposed on the buffer layer and the poly-silicon layer, a scan line layer disposed on the first insulating layer, a second insulating layer disposed on the first insulating layer and the scan line layer, a data line layer disposed on the second insulating layer, and connected to the poly-silicon layer through a first through hole, a third insulating layer disposed on the second insulating layer and the data line layer, a common line layer disposed on the third insulating layer, a touch-sensing line layer, a fourth insulating layer disposed on the touch-sensing line layer, a pixel electrode layer disposed on the fourth insulating layer, a pixel area, and a fan-out area including a groove, a first subarea and a second subarea. The groove is disposed on the third insulating layer, and located in the fan-out area, the color filter substrate and the thin film transistor array substrate are assembled as one piece, and the liquid crystal layer is disposed between the color filter substrate and the thin film transistor array substrate.

In one embodiment of the present invention, a part of the touch-sensing line layer located in the second subarea bypasses the groove from a bottom of the groove by the data line layer and the scan line layer.

In one embodiment of the present invention, the scan line layer comprises a first signal line array disposed on the first subarea and the second subarea, wherein the first signal line array on the second subarea is located below the groove along a first direction, and the first direction is vertical with respect to the substrate, and directed from the substrate to the pixel electrode layer. The data line layer comprises a second signal line array disposed on the first subarea, wherein the second signal line array is connected to the first signal line array through a second through hole, and the second through hole is located in the first subarea and disposed on the second insulating layer. The touch-sensing line layer comprises a third signal line array disposed on the first subarea, wherein the third signal line array is connected to the second signal line array through a third through hole, and the third through hole is located in the first subarea and disposed on the third insulating layer.

In one embodiment of the present invention, the first signal line array includes at least one first signal sub-line, and at least one second signal sub-line. The data line layer further includes a fourth signal line array disposed on the second subarea, wherein the fourth signal line array is connected to the second signal sub-line through a fourth through hole, and the fourth through hole is located in the second subarea and disposed on the second insulating layer.

In one embodiment of the present invention, an edge of the groove is located between the first subarea and the second subarea.

To achieve the above object, the present invention provides a display panel which comprises a color filter substrate, a liquid crystal layer, and a thin film transistor array substrate. The thin film transistor array substrate includes a substrate, a light shielding layer disposed on the substrate, a buffer layer disposed on the substrate and the light shielding layer, a poly-silicon layer disposed on the buffer layer, a first insulating layer disposed on the buffer layer and the poly-silicon layer, a scan line layer disposed on the first insulating layer, a second insulating layer disposed on the first insulating layer and the scan line layer, a data line layer disposed on the second insulating layer, and connected to the poly-silicon layer through a first through hole, a third insulating layer disposed on the second insulating layer and the data line layer, a common line layer disposed on the third insulating layer, a touch-sensing line layer, a fourth insulating layer disposed on the touch-sensing line layer, a pixel electrode layer disposed on the fourth insulating layer, a pixel area, and a fan-out area including a groove.

In one embodiment of the present invention, the fan-out area includes a first subarea and a second subarea, and the groove is disposed on the third insulating layer, and located in the second subarea.

In one embodiment of the present invention, a part of the touch-sensing line layer located in the second subarea bypasses the groove from a bottom of the groove by the data line layer and the scan line layer.

In one embodiment of the present invention, the scan line layer comprises a first signal line array disposed on the first subarea and the second subarea, wherein the first signal line array on the second subarea is located below the groove along a first direction, and the first direction is vertical with respect to the substrate, and directed from the substrate to the pixel electrode layer. The data line layer comprises a second signal line array disposed on the first subarea, wherein the second signal line array is connected to the first signal line array through a second through hole, and the second through hole is located in the first subarea and disposed on the second insulating layer. The touch-sensing line layer comprises a third signal line array disposed on the first subarea, wherein the third signal line array is connected to the second signal line array through a third through hole, and the third through hole is located in the first subarea and disposed on the third insulating layer.

In one embodiment of the present invention, the first signal line array includes at least one first signal sub-line, and at least one second signal sub-line. The data line layer further includes a fourth signal line array disposed on the second subarea, wherein the fourth signal line array is connected to the second signal sub-line through a fourth through hole, and the fourth through hole is located in the second subarea and disposed on the second insulating layer.

In one embodiment of the present invention, an edge of the groove is located between the first subarea and the second subarea.

In one embodiment of the present invention, the groove is disposed on the third insulating layer, and located in the fan-out area.

To achieve the above object, the present invention provides a thin film transistor array substrate which comprises a substrate, a light shielding layer disposed on the substrate, a buffer layer disposed on the substrate and the light shielding layer, a poly-silicon layer disposed on the buffer layer, a first insulating layer disposed on the buffer layer and the poly-silicon layer, a scan line layer disposed on the first insulating layer, a second insulating layer disposed on the first insulating layer and the scan line layer, a data line layer disposed on the second insulating layer, and connected to the poly-silicon layer through a first through hole, a third insulating layer disposed on the second insulating layer and the data line layer, a common line layer disposed on the third insulating layer, a touch-sensing line layer, a fourth insulating layer disposed on the touch-sensing line layer, a pixel electrode layer disposed on the fourth insulating layer, a pixel area, and a fan-out area including a groove.

In one embodiment of the present invention, the fan-out area includes a first subarea and a second subarea, and the groove is disposed on the third insulating layer, and located in the second subarea.

In one embodiment of the present invention, a part of the touch-sensing line layer located in the second subarea bypasses the groove from a bottom of the groove by the data line layer and the scan line layer.

In one embodiment of the present invention, the scan line layer comprises a first signal line array disposed on the first subarea and the second subarea, wherein the first signal line array on the second subarea is located below the groove along a first direction, and the first direction is vertical with respect to the substrate, and directed from the substrate to the pixel electrode layer. The data line layer comprises a second signal line array disposed on the first subarea, wherein the second signal line array is connected to the first signal line array through a second through hole, and the second through hole is located in the first subarea and disposed on the second insulating layer. The touch-sensing line layer comprises a third signal line array disposed on the first subarea, wherein the third signal line array is connected to the second signal line array through a third through hole, and the third through hole is located in the first subarea and disposed on the third insulating layer.

In one embodiment of the present invention, the first signal line array includes at least one first signal sub-line, and at least one second signal sub-line. The data line layer further includes a fourth signal line array disposed on the second subarea, wherein the fourth signal line array is connected to the second signal sub-line through a fourth through hole, and the fourth through hole is located in the second subarea and disposed on the second insulating layer.

In one embodiment of the present invention, an edge of the groove is located between the first subarea and the second subarea.

In one embodiment of the present invention, the groove is disposed on the third insulating layer, and located in the fan-out area.

Compared with the prior art, the present invention is to provide a liquid crystal display panel and a thin film transistor array substrate which avoids the residual metal left in the edge of the groove of the third insulating layer 309 from depositing the M3 wires. Thus the fan-out area can prevent the wire shorts arising from residual metal.

The present invention is described in detail below by way of specific embodiments in conjunction with the accompanying drawings.

DETAILED DESCRIPTION OF THE PREFERRED EMBODIMENTS

Regarding the words used in the present specification, "an embodiment" means used as an example, examples, or illustrations. In addition, in this specification and the appended claims the article "a" in general can be interpreted to mean "one or more" unless specified otherwise or clear from the context to be oriented to the singular form.

A display panel according to a preferred embodiment of the present invention is a thin film transistor liquid crystal display. The display panel has a color filter substrate, a liquid crystal layer, and a thin film transistor array substrate. The color filter substrate and the thin film transistor array substrate are assembled as one piece, and the liquid crystal layer is disposed between the color filter substrate and the thin film transistor array substrate.

Figure 1:
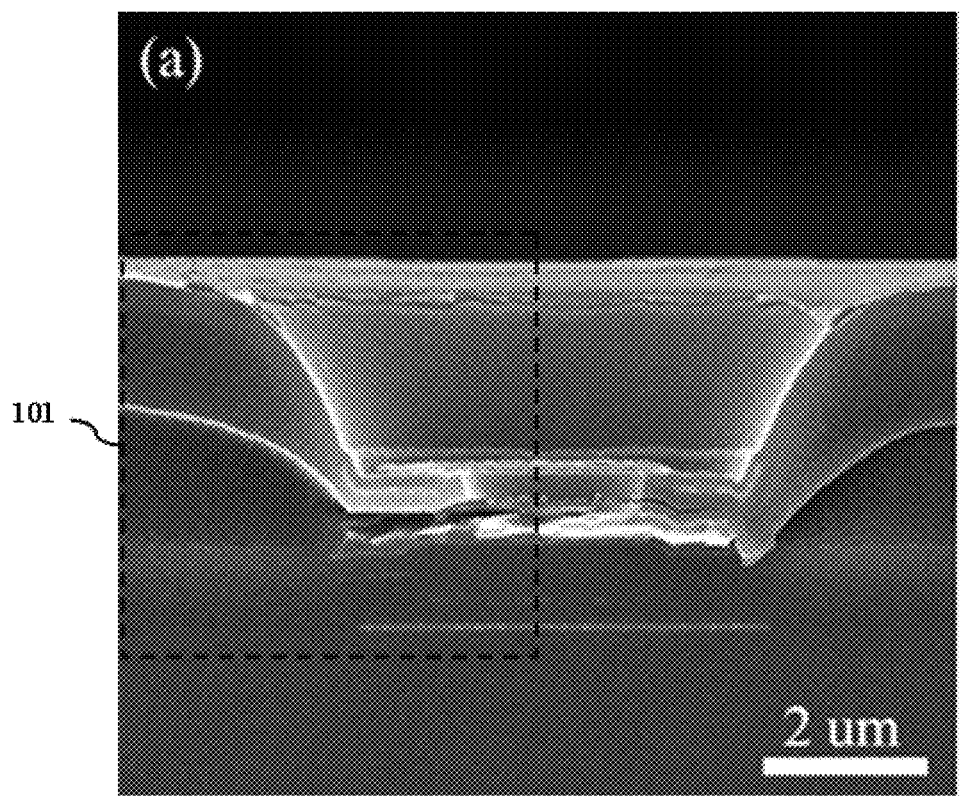
FIG. 1 is a schematic view of residual metal in the trench of the fan-out area of a traditional thin film transistor array substrate.
Figure 2:
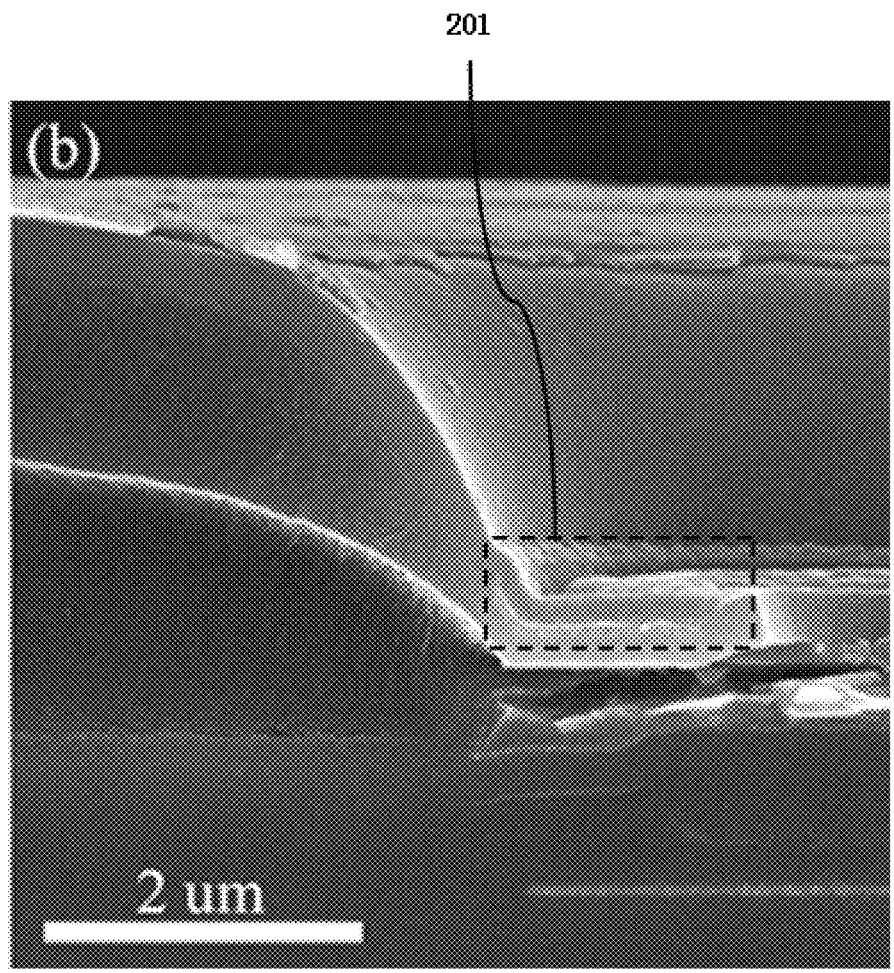
FIG. 2 is a partial enlarged view of FIG. 1.
Figure 3:
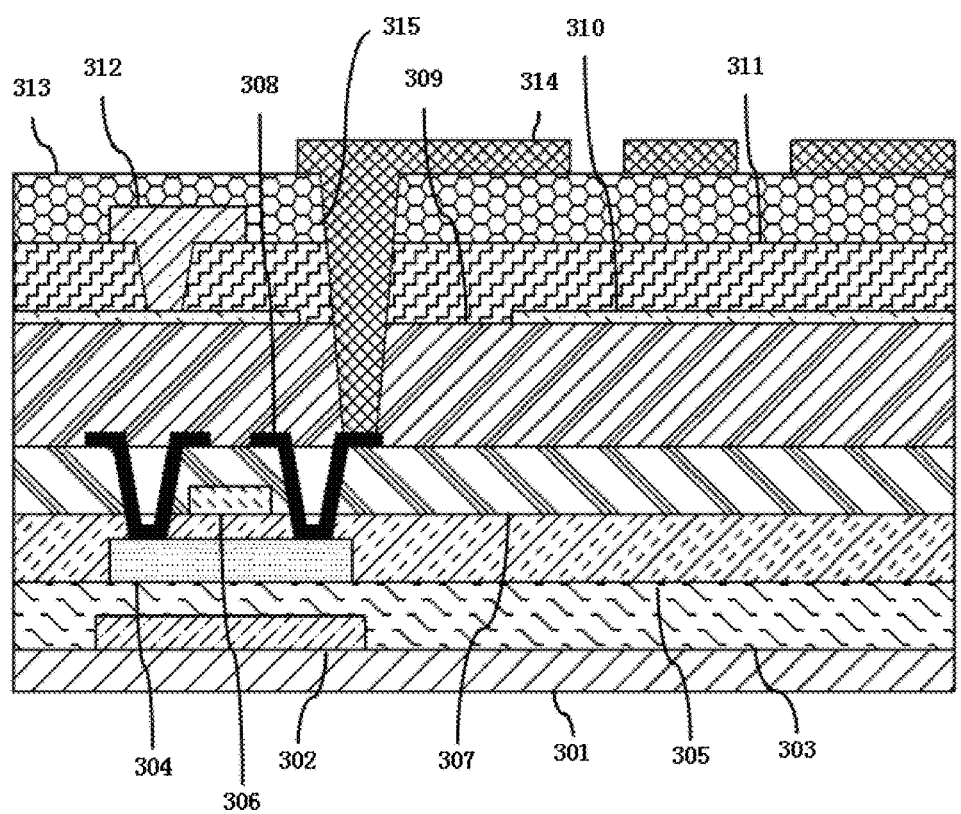
FIG. 3 is a cross-sectional view of a display area of a thin film transistor array substrate according to the present invention.

Refer to FIG. 3, which is a cross-sectional view of a display area of a thin film transistor array substrate according to the present invention. The thin film transistor array substrate has a pixel area and a fan-out area. The fan-out area includes a groove. Specifically, a groove is disposed in a third insulating layer 309 (planarization layer) of the fan-out area.

In the embodiment of the present invention, the thin film transistor array substrate includes a substrate 301, a light shielding layer 302, a buffer layer 303, a poly-silicon layer 304, a first insulating layer 305, a scan line layer 306, a second insulating layer 307, a data line layer 308, a third insulating layer 309, a common line layer 310, a touch-sensing line layer 312, a fourth insulating layer 313, and a pixel electrode layer 314.

The light shielding layer 302 is disposed on the substrate 301. The buffer layer 303 is disposed on the substrate 301 and the light shielding layer 302. The poly-silicon layer 304 is disposed on the buffer layer 303. The first insulating layer 305 is disposed on the buffer layer 303 and the poly-silicon layer 304. The first insulating layer 305 is disposed on the buffer layer 303 and the poly-silicon layer 304. The scan line layer 306 is disposed on the first insulating layer 305. The second insulating layer 307 is disposed on the first insulating layer 305 and the scan line layer 306. The data line layer 308 is disposed on the second insulating layer 307, and the data line layer 308 is connected to the poly-silicon layer 304 through a first through hole 315. The third insulating layer 309 is disposed on the second insulating layer 307 and the data line layer 308. The common line layer 310 is disposed on the third insulating layer 309. A fifth insulating layer 311 is disposed on the common line layer 310. The touch-sensing line layer 312 is disposed on the fifth insulating layer 311. The fourth insulating layer 313 is disposed on the touch-sensing line layer 312. The pixel electrode layer 314 is disposed on the fourth insulating layer 313.

Figure 4:
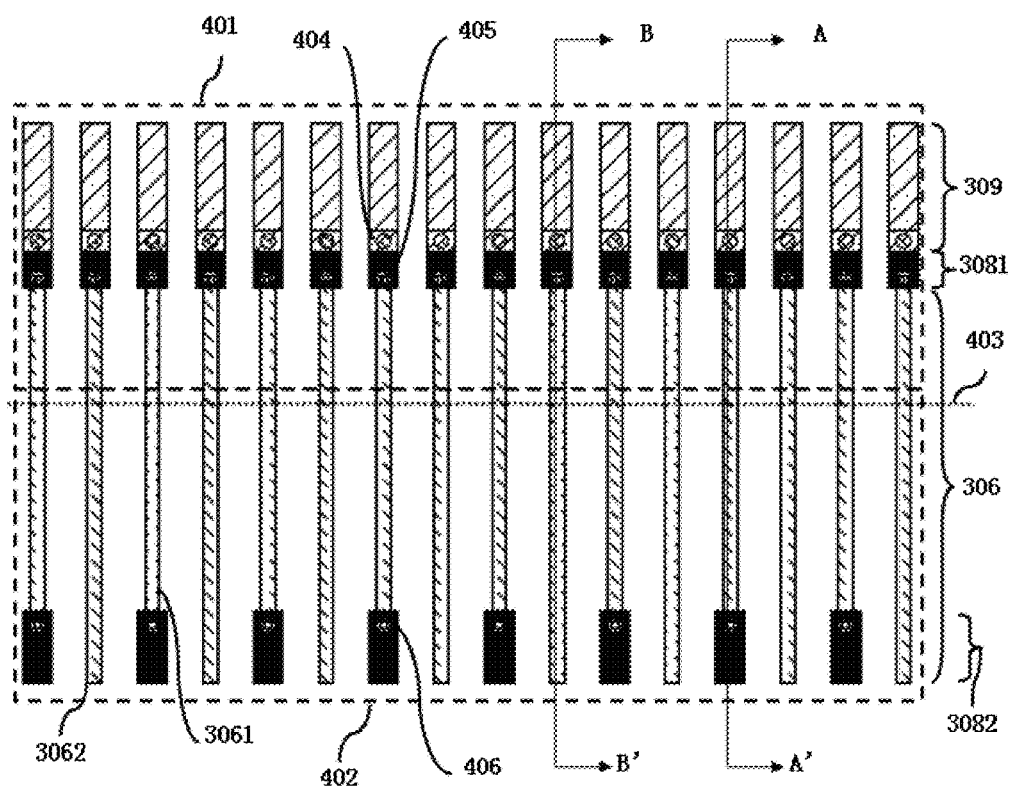
FIG. 4 is a top view of a fan-out area of a thin film transistor array substrate according to the present invention.
Figure 5:
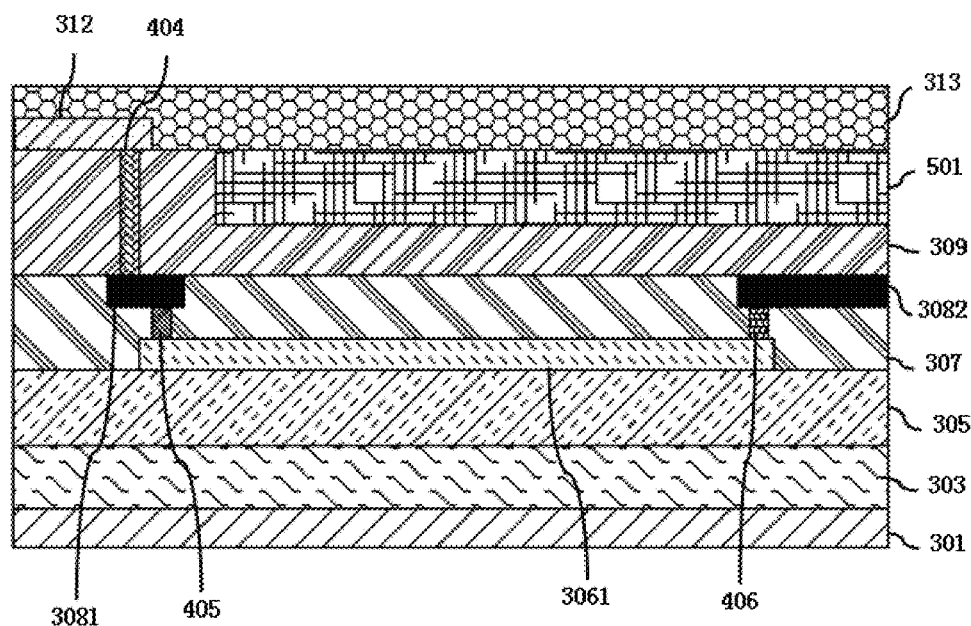
FIG. 5 is a cross-sectional view taken along a line A-A' in FIG. 4.
Figure 6:
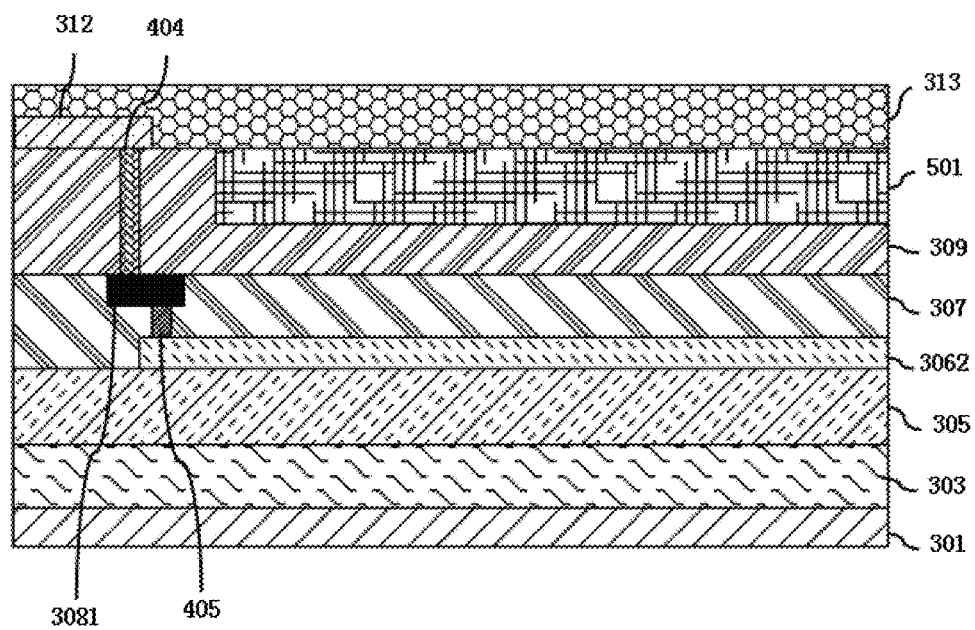
FIG. 6 is a cross-sectional view taken along a line B-B' in FIG. 4.

Refer to FIGS. 4 to 6, FIG. 4 is a top view of a fan-out area of a thin film transistor array substrate according to the present invention. FIG. 5 is a cross-sectional view taken along a line A-A' in FIG. 4. FIG. 6 is a cross-sectional view taken along a line B-B' in FIG. 4.

In the embodiment of the present invention, the fan-out area includes a first subarea 401 and a second subarea 402. The groove is disposed on the third insulating layer 309, and the groove is located in the second subarea 402 of the fan-out area. An edge 403 of the groove is located between the first subarea 401 and the second subarea 402.

In the embodiment of the present invention, a part of the touch-sensing line layer 312 is located in the second subarea 402 bypasses the groove from a bottom of the groove by the data line layer 308 and the scan line layer 306.

In the embodiment of the present invention, the scan line layer 306 comprises a first signal line array 306. The first signal line array 306 is disposed on the first subarea 401 and the second subarea 402. The first signal line array 306 on the second subarea 402 is located below the groove along a first direction.

The data line layer 308 comprises a second signal line array 3081. The second signal line array 3081 is disposed on the first subarea 401. The second signal line array 3081 is connected to the first signal line array 306 through a second through hole 405. The second through hole 405 is located in the first subarea 401. The second through hole 405 is disposed on the second insulating layer 307.

The touch-sensing line layer 312 comprises a third signal line array 309. The third signal line array 309 is disposed on the first subarea 401. The third signal line array 309 is connected to the second signal line array 3081 through a third through hole 404. The third through hole 404 is located in the first subarea 401. The third through hole 404 is disposed on the third insulating layer 309.

Wherein the first direction is vertical with respect to the substrate 301, and directed from the substrate 301 to the pixel electrode layer 314.

In the embodiment of the present invention, the first signal line array 306 includes at least one first signal sub-line 3061, and at least one second signal sub-line 3062. The data line layer 308 further includes a fourth signal line array 3082. The fourth signal line array 3082 is disposed on the second subarea 402. The fourth signal line array 3082 is connected to the second signal sub-line 3062 through a fourth through hole 406.

The fourth through hole 406 is located in the second subarea 402. The fourth through hole 406 is disposed on the second insulating layer 307.

In the embodiment of the present invention, the groove area of the third insulating layer 309 in the fan-out area adopts M1 wires (the wires of the scan line layer 306).

Because the M1 wires are disposed below the third insulating layer 309, the wires of the fan-out area can be guided out, and connected to M2 wires (the wires of the data line layer 308) through the jumper of the second insulating layer 307, and connected to M3 wires (the wires of the touch-sensing line layer 312) through the jumper of the third insulating layer 309 to transmits the signals.

The present invention is to provide a liquid crystal display panel and a thin film transistor array substrate which avoids the residual metal left in the edge of the groove of the third insulating layer 309 from depositing the M3 wires. Thus the fan-out area can be protected from the short-circuit problem arising from residual metal.

Moreover, despite relative to one or more implementations shown and described the present disclosure, various equivalent modifications will occur to those skilled in the art based on the present specification and drawings. The present disclosure includes all such modifications and variations, and is only limited by the scope of the appended claims. Particularly, with regard to various functions performed by the above-described components (e.g., elements, resources, etc.), the terms used to describe such components are intended to perform the function corresponding to the specified component (e.g., which is functionally equivalent) of any component (unless otherwise indicated), even if the structure of the implementation and execution of the function of the present disclosure is not structurally equivalent. Additionally, although a particular feature of the present disclosure has been made with respect to certain implementations, only one is open, but this feature may be as given or particular application and the purpose of enabling a desired one or more other implementations other combinations of features. Moreover, the terms "comprising", "having", "containing", or variants thereof as used in the detailed description or the claims are intended to be used in a manner similar to the term "comprising".

The present invention has been described with a preferred embodiment thereof and it is understood that many changes and modifications to the described embodiment can be carried out without departing from the scope and the spirit of the invention that is intended to be limited only by the appended claims.

What is claimed is:
1. A display panel comprising:
   a color filter substrate;
   a liquid crystal layer; and
   a thin film transistor array substrate including:
      a substrate;
      a light shielding layer disposed on the substrate;
      a buffer layer disposed on the substrate and the light shielding layer;
      a poly-silicon layer disposed on the buffer layer;
      a first insulating layer disposed on the buffer layer and the poly-silicon layer;
      a scan line layer disposed on the first insulating layer;
      a second insulating layer disposed on the first insulating layer and the scan line layer;
      a data line layer disposed on the second insulating layer, and connected to the poly-silicon layer through a first through hole;
      a third insulating layer disposed on the second insulating layer and the data line layer;
      a common line layer disposed on the third insulating layer;
      a touch-sensing line layer;
      a fourth insulating layer disposed on the touch-sensing line layer;

a pixel electrode layer disposed on the fourth insulating layer;
a pixel area; and
a fan-out area including a groove, a first subarea, and a second subarea;
wherein the groove is disposed on the third insulating layer, and located in the second subarea of the fan-out area, the color filter substrate and the thin film transistor array substrate are assembled as one piece, and the liquid crystal layer is disposed between the color filter substrate and the thin film transistor array substrate;
wherein the scan line layer comprises a first signal line array disposed on the first subarea and the second subarea, wherein the first signal line array on the second subarea is located below the groove along a first direction, and the first direction is vertical to the substrate, and directed from the substrate to the pixel electrode layer;
the data line layer comprises a second signal line array disposed on the first subarea, wherein the second signal line array is connected to the first signal line array through a second through hole, and the second through hole is located in the first subarea and disposed on the second insulating layer;
the touch-sensing line layer comprises a third signal line array disposed on the first subarea, wherein the third signal line array is connected to the second signal line array through a third through hole, and the third through hole is located in the first subarea and disposed on the third insulating layer.

2. The display panel according to claim 1, wherein a part of the touch-sensing line layer is located in the second subarea bypasses the groove from a bottom of the groove by the data line layer and the scan line layer.

3. The display panel according to claim 1, wherein the first signal line array includes:
at least one first signal sub-line, and at least one second signal sub-line;
the data line layer further includes:
a fourth signal line array disposed on the second subarea, wherein the fourth signal line array is connected to the second signal sub-line through a fourth through hole, and the fourth through hole is located in the second subarea and disposed on the second insulating layer.

4. The display panel according to claim 1, wherein an edge of the groove is located between the first subarea and the second subarea.

5. A display panel comprising:
a color filter substrate;
a liquid crystal layer; and
a thin film transistor array substrate including:
a substrate;
a light shielding layer disposed on the substrate;
a buffer layer disposed on the substrate and the light shielding layer;
a poly-silicon layer disposed on the buffer layer;
a first insulating layer disposed on the buffer layer and the poly-silicon layer;
a scan line layer disposed on the first insulating layer;
a second insulating layer disposed on the first insulating layer and the scan line layer;
a data line layer disposed on the second insulating layer, and connected to the poly-silicon layer through a first through hole;
a third insulating layer disposed on the second insulating layer and the data line layer;
a common line layer disposed on the third insulating layer;
a touch-sensing line layer;
a fourth insulating layer disposed on the touch-sensing line layer;
a pixel electrode layer disposed on the fourth insulating layer;
a pixel area; and
a fan-out area including a groove, a first subarea, and a second subarea;
wherein the scan line layer comprises a first signal line array disposed on the first subarea and the second subarea, wherein the first signal line array on the second subarea is located below the groove along a first direction, and the first direction is vertical to the substrate, and directed from the substrate to the pixel electrode layer;
the data line layer comprises a second signal line array disposed on the first subarea, wherein the second signal line array is connected to the first signal line array through a second through hole, and the second through hole is located in the first subarea and disposed on the second insulating layer;
the touch-sensing line layer comprises a third signal line array disposed on the first subarea, wherein the third signal line array is connected to the second signal line array through a third through hole, and the third through hole is located in the first subarea and disposed on the third insulating layer.

6. The display panel according to claim 5, wherein the groove is disposed on the third insulating layer, and located in the second subarea.

7. The display panel according to claim 6, wherein a part of the touch-sensing line layer is located in the second subarea bypasses the groove from a bottom of the groove by the data line layer and the scan line layer.

8. The display panel according to claim 5, wherein the first signal line array includes:
at least one first signal sub-line, and at least one second signal sub-line;
the data line layer further includes:
a fourth signal line array disposed on the second subarea, wherein the fourth signal line array is connected to the second signal sub-line through a fourth through hole, and the fourth through hole is located in the second subarea and disposed on the second insulating layer.

9. The display panel according to claim 6, wherein an edge of the groove is located between the first subarea and the second subarea.

10. The display panel according to claim 5, wherein the groove is disposed on the third insulating layer, and located in the fan-out area.

11. A thin film transistor array substrate comprising:
a substrate;
a light shielding layer disposed on the substrate;
a buffer layer disposed on the substrate and the light shielding layer;
a poly-silicon layer disposed on the buffer layer;
a first insulating layer disposed on the buffer layer and the poly-silicon layer;
a scan line layer disposed on the first insulating layer;
a second insulating layer disposed on the first insulating layer and the scan line layer;
a data line layer disposed on the second insulating layer, and connected to the poly-silicon layer through a first through hole;

a third insulating layer disposed on the second insulating layer and the data line layer;

a common line layer disposed on the third insulating layer;

a touch-sensing line layer;

a fourth insulating layer disposed on the touch-sensing line layer;

a pixel electrode layer disposed on the fourth insulating layer;

a pixel area; and a fan-out area including a groove, a first subarea, and a second subarea;

wherein the scan line layer comprises a first signal line array disposed on the first subarea and the second subarea, wherein the first signal line array on the second subarea is located below the groove along a first direction, and the first direction is vertical to the substrate, and directed from the substrate to the pixel electrode layer;

the data line layer comprises a second signal line array disposed on the first subarea, wherein the second signal line array is connected to the first signal line array through a second through hole, and the second through hole is located in the first subarea and disposed on the second insulating layer;

the touch-sensing line layer comprises a third signal line array disposed on the first subarea, wherein the third signal line array is connected to the second signal line array through a third through hole, and the third through hole is located in the first subarea and disposed on the third insulating layer.

12. The thin film transistor array substrate according to claim 11, wherein the groove is disposed on the third insulating layer, and located in the second subarea.

13. The thin film transistor array substrate according to claim 12, wherein a part of the touch-sensing line layer is located in the second subarea bypasses the groove from a bottom of the groove by the data line layer and the scan line layer.

14. The thin film transistor array substrate according to claim 11, wherein the first signal line array includes:

at least one first signal sub-line, and at least one second signal sub-line;

the data line layer further includes:

a fourth signal line array disposed on the second subarea, wherein the fourth signal line array is connected to the second signal sub-line through a fourth through hole, and the fourth through hole is located in the second subarea and disposed on the second insulating layer.

15. The thin film transistor array substrate according to claim 12, wherein an edge of the groove is located between the first subarea and the second subarea.

16. The thin film transistor array substrate according to claim 11, wherein the groove is disposed on the third insulating layer, and located in the fan-out area.

\* \* \* \* \*